US010216445B2

(12) United States Patent
Li et al.

(10) Patent No.: US 10,216,445 B2
(45) Date of Patent: Feb. 26, 2019

(54) KEY-VALUE DEDUPLICATION

(71) Applicant: Intel Corporation, Santa Clara, CA (US)

(72) Inventors: Peng Li, Hillsboro, OR (US); Jawad B. Khan, Cornelius, OR (US); Sanjeev N. Trika, Portland, OR (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 15/639,450

(22) Filed: Jun. 30, 2017

(65) Prior Publication Data
US 2019/0004726 A1    Jan. 3, 2019

(51) Int. Cl.
*G06F 3/06*    (2006.01)

(52) U.S. Cl.
CPC .......... *G06F 3/0641* (2013.01); *G06F 3/0608* (2013.01); *G06F 3/0688* (2013.01); *G06F 3/067* (2013.01)

(58) Field of Classification Search
None
See application file for complete search history.

(56) References Cited

U.S. PATENT DOCUMENTS 8,996,563 B2 *  3/2015  Bender ............. G06F 17/30306
                                                        707/769
2011/0246741 A1 * 10/2011 Raymond ......... G06F 17/30159
                                                        711/170
2013/0013865 A1 *  1/2013 Venkatesh ......... G06F 17/30132
                                                        711/133

(Continued)

OTHER PUBLICATIONS

Clemons, T., et.al.: "Hash in a Flash: Hash Tables for Solid State Devices", arXiv.org, Nov. 19, 2012, arXiv:1211.4521v1 [cs.DB], 16 pages, Cornell University, Ithaca, NY, USA, https://arxiv.org/pdf/1211.4521.pdf.

(Continued)

*Primary Examiner* — Brian R Peugh
(74) *Attorney, Agent, or Firm* — Grossman, Tucker, Perreault & Pfleger, PLLC

(57) ABSTRACT

One embodiment provides an apparatus. The apparatus include a device storage logic. The device storage logic is to determine a key-based pointer based, at least in part, on a key included in an input key-value (KV) pair received from a host device and to determine whether a unique input KV data block included in the input KV pair is duplicated in a nonvolatile memory circuitry of a storage device. The device storage logic is further to set a descriptor pointer associated with the unique input KV data block to point to a physical nonvolatile memory (NVM) address associated with an existing unique data block and increment a first reference count associated with the existing unique data block, if the unique input KV data block is a duplicate of the existing unique data block, or store the input KV data block to a physical NVM location associated with a selected physical NVM address, set the descriptor pointer to point to the selected physical NVM address and set a second reference count associated with the selected physical NVM address to one, if the unique input KV data block is not duplicated in the NVM circuitry.

25 Claims, 6 Drawing Sheets

(56) References Cited

U.S. PATENT DOCUMENTS

2018/0089074 A1    3/2018  Li et al.

OTHER PUBLICATIONS

Menon, P., et.al.: "CaSSanDra: An SSD Boosted Key-Value Store", 2014 IEEE 30th International Conference on Data Engineering, Mar. 31-Apr. 4, 2014, May 19, 2014, 6 pages, IEEE, Piscataway, NJ, USA.
Jin, Y., et.al.: "KAML: A Flexible, High-Performance Key-Value SSD", The (2017) 23rd IEEE Symposium on High Performance Computer Architecture, Feb. 4-8, 2017, May 8, 2017, 12 pages, IEEE, Piscataway, NJ, USA.
Lu, L., et.al.: "WiscKey: Separating Keys from Values in SSD-conscious Storage", 14th Advanced Computing Systems Association (USENIX) Conference on File and Storage Technologies (FAST'16), Feb. 22-25, 2016, pp. 133-148, USENIX Association, Berkeley, CA, USA.
Seagate Kinetic Drives: http://www.seagate.comitech-insights/kinetic-vision-how-seagate-new-developer-tools-meets-the-needs-of-cloud-storage-platforms-master-ti/, Downloaded Nov. 2, 2017, 41 pages.
U.S. Appl. No. 15/279,279, filed Sep. 28, 2016.

\* cited by examiner

KEY-VALUE DEDUPLICATION

FIELD

The present disclosure relates to key-value deduplication, in particular to, key-value deduplication in a storage device.

BACKGROUND

Conventional key-value/object-storage systems may contain a relatively large amount of redundant information. For example, a document/image database system can have multiple documents/image that have the same or similar contents. Such redundant information may consume a significant amount of storage space.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
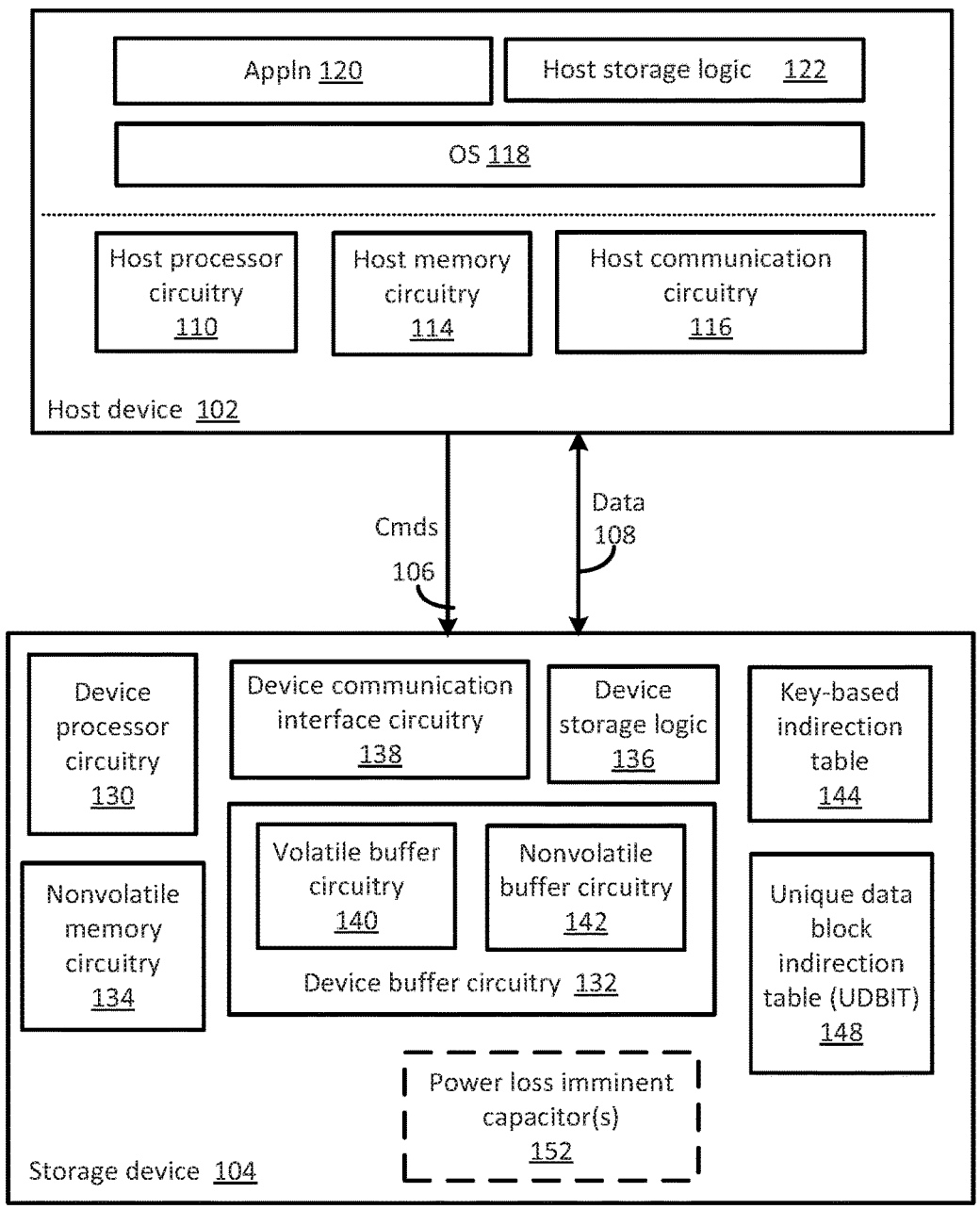
FIG. 1 illustrates a functional block diagram of a system that includes a key-value ("KV") data deduplication ("dedupe") storage system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to key-value deduplication, in particular to, key-value ("KV") deduplication ("dedupe") in a storage device. A system, apparatus and/or method are configured to perform data dedupe operations on a storage device. The system, apparatus and/or method are configured to determine whether a block of data included in a KV pair to be stored is a duplicate of an existing stored block of data. A pointer may be set to point to the currently stored data block if the block of data to be stored is a duplicate and a reference count may be incremented. If the block of data to be stored is not a duplicate, the block of data may be stored and the reference count may be set to one.

The storage device is configured to manage indirection between a host device and the storage device using, for example, a hash to pointer technique. An incoming (i.e., input) key may be hashed to generate a corresponding head pointer that points to a linked list stored in a hash table. Each node ("node pointer") in the linked list is configured to point to a respective KV descriptor. As used herein, each node pointer corresponds to a key-based pointer. Each KV descriptor is configured to contain information related to a corresponding KV pair. Each KV descriptor is further configured to contain one or more descriptor pointers configured to point to one or more physical nonvolatile memory (NVM) addresses included in unique data block indirection table (UDBIT). Each physical NVM address included in the UDBIT is configured to correspond to a respective unique data block. A selected KV descriptor may point to one or more physical NVM address(es) and, thus, to one or more unique data block(s). A selected physical NVM address included in the UDBIT (and corresponding selected data block) may be pointed to by one or more KV descriptors.

The storage device is further configured to maintain a respective count of a number of descriptor pointers that point to each physical NVM address. The number of descriptor pointers corresponds to the reference count. A count of zero corresponds to data that is no longer in use, i.e., is no longer valid, indicating that the corresponding data block in the NVM may be erased and/or reused.

A granularity of the data blocks and thus dedupe granularity may vary and is related to (i.e., is a characteristic of) the data. As used herein, granularity corresponds to a size of a data block, a size of a dedupe block and a granularity of a unique data block indirection table (UDBIT). For example, some workloads may include a plurality of relatively small random writes, e.g., a data block size of on the order of ones of Kibibytes (KiB). In this example, data block, dedupe and UDBIT granularity may then be on the order of ones of KiB, e.g., 4 KiB. In another example, a workload may be relatively larger, e.g. on the order of tens of KiB or ones of MiB. In this example, the data block, dedupe and UDBIT granularity may be relatively larger than ones of KiB. The dedupe operations may thus be performed at one or more granularities corresponding to a respective data block granularity (ies).

In some embodiments, an apparatus, system and/or method consistent with the present disclosure may be configured to support a plurality of UDBITs. For example, a number of UDBITs may correspond to the number of data block (and thus dedupe) granularities. Each UDBIT may then correspond to a respective dedupe granularity.

In some of the following, KV dedupe operations may be described in the context of block addressable read-modify-write non-volatile memory, for example, NAND-based storage devices and/or NOR-based storage devices. Other future generation nonvolatile memory devices, such as a three dimensional crosspoint memory device, or other byte addressable write-in-place nonvolatile memory devices may be used for storing the user data (key-value pairs). In some embodiments, 3D crosspoint memory may comprise a transistor-less stackable cross point architecture in which memory cells sit at the intersection of word lines and bit lines and are individually addressable and in which bit storage is based on a change in bulk resistance.

In some embodiments, the KV dedupe techniques described herein may be implemented in and/or by a host device.

In an embodiment, a key-based pointer may be determined based, at least in part, on a key included in an input key-value (KV) pair received from a host device. A unique input KV data block, included in the input KV pair may be determined using, for example, a dedupe technique. Whether the unique input KV data block included in the input KV pair is duplicated in a nonvolatile memory circuitry of a storage device may then be determined. If the unique input KV data block is a duplicate of the existing unique data block, descriptor pointer associated with the unique input KV data block may be set to point to a physical nonvolatile memory (NVM) address associated with an existing unique data block and a first reference count associated with the existing unique data block may be incremented. If the unique input KV data block is not duplicated in the NVM circuitry, the unique input KV data block may be stored in a physical NVM location associated with a selected physical NVM address, the descriptor pointer may be set to point to the selected physical NVM address and a second reference count associated with the selected physical NVM address may be incremented, i.e., may be set to one.

A plurality of levels of indirection ("indirection levels") are described herein. The key-based pointer corresponds to a first indirection level and may be stored in a key-based indirection table, for example, may be stored in a linked list in a hash table. The descriptor pointer corresponds to a second indirection level and may be included in a first KV descriptor. The first KV descriptor may be stored in NVM, for example, in a block addressable read-modify-write NVM page. For example, the block addressable read-modify-write NVM page may correspond to a NAND page for NAND type NVM or a NOR page for NOR type NVM. The selected physical NVM address corresponds to a third level of indirection. In another example, the first KV descriptor may be stored in byte addressable write-in-place memory. The selected physical NVM address and associated second reference count may be stored in a unique data block indirection table (UDBIT). The key-based pointer is configured to point to the first KV descriptor. The descriptor pointer is configured to point to the physical NVM address in the UDBIT. The physical NVM address is configured to point to a physical memory location.

Thus, storing duplicate data blocks to a storage device may be avoided and storage device capacity may be efficiently used.

FIG. 1 illustrates a functional block diagram of a system 100 that includes a key-value ("KV") data deduplication ("dedupe") storage system consistent with several embodiments of the present disclosure. System 100 includes a host device 102 and a storage device 104. The storage device 104 may be coupled to and/or included in host device 102. The host device 102 is configured to provide commands 106 to the storage device 104. The commands may include, but are not limited to, Put(key, value), Get(key), Delete(key), Scan (key1, key2), etc. The commands 106 may be sent to the storage device 104 via a host interface, using a standard bus command, for example, SCSI (Small Computer System Interface), SAS (Serial Attached SCSI), PCIe (Peripheral Component Interconnect Express), NVMe (Non-Volatile Memory Express), SATA (Serial ATA (Advanced Technology Attachment)), etc. Data 108 may be transmitted between to host device 102 and storage device 104. Data 108 may include one or more KV pairs.

Host device 102 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Host device 102 includes a host processor circuitry 110, a host memory circuitry 114 and a host communication circuitry 116. For example, host processor circuitry 110 may correspond to a single core or a multi-core general purpose processor, such as those provided by Intel® Corp., etc. Host device 102 may further include an operating system (OS) 118 and one or more applications, e.g., application 120. Host device 102 may further include a host storage logic 122. Host storage logic 122 may be coupled to and/or included in OS 118 and/or application 120. In one nonlimiting example, host storage logic 122 may include a key-value application programming interface (API).

Storage device 104 may include, but is not limited to, a solid-state drive (SSD), a hard disk drive (HDD), a network attached storage (NAS) system, a storage area network (SAN) and/or a redundant array of independent disks (RAID) system, etc. Storage device 104 includes a device processor circuitry 130, a device buffer circuitry 132 and a nonvolatile memory (NVM) circuitry 134. Storage device 104 may further include a device storage logic 136. Storage device 104 may further include a device communication interface circuitry 138. The device communication interface circuitry 138 may include, for example, a host interface. Device buffer circuitry 132 includes volatile buffer circuitry 140. Device buffer circuitry 132 may further include nonvolatile buffer circuitry 142. Volatile buffer circuitry 140 may include volatile random-access memory, e.g., dynamic random access memory (DRAM) and/or static random access memory (SRAM), etc.

Nonvolatile buffer circuitry 142 may include nonvolatile memory. Nonvolatile buffer circuitry 142 may include byte-addressable write-in-place memory and other future types of byte-addressable write-in-place memory. Nonvolatile buffer circuitry 142 may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Device processor circuitry 130 may include, but is not limited to, a microcontroller, an application-specific integrated circuit (ASIC), a programmable logic device (PLD), a complex PLD, etc. Device buffer circuitry 132 may be configured to store a key-based indirection table 144, as described herein. NVM circuitry 134 may be configured to store a first KV descriptor 146 and one or more unique data block indirection table(s) (UDBIT(s)), e.g., UDBIT 148. In some embodiments, storage device 104 may include one or more power loss imminent capacitor(s) 152.

Nonvolatile memory (NVM) circuitry 134 includes a storage medium that does not require power to maintain the state of data stored in the storage medium. NVM circuitry 134 may include block addressable read-modify-write nonvolatile memory. NVM circuitry 134 may include, but is not limited to, a NAND flash memory (e.g., a Triple Level Cell (TLC) NAND or any other type of NAND (e.g., Single Level Cell (SLC), Multi Level Cell (MLC), Quad Level Cell (QLC), etc.)), NOR memory, solid state memory (e.g., planar or three Dimensional (3D) NAND flash memory or NOR flash memory), storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), byte addressable random accessible 3D crosspoint memory, ferroelectric transistor random access memory (Fe-TRAM), magnetoresistive random access memory (MRAM), phase change memory (PCM, PRAM), resistive memory, ferroelectric memory (F-RAM, FeRAM), spin-transfer torque memory (STT), thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM, ovonic memory, nanowire memory, electrically erasable programmable read-only memory (EEPROM), etc. In some embodiments, the byte addressable random accessible 3D crosspoint memory may include a transistor-less stackable cross point architecture in which memory cells sit at the intersection of words lines and bit lines and are individually addressable and in which bit storage is based on a change in bulk resistance.

In operation, host device 102 is configured to store data to storage device 104. Data may be written to or read from storage device 104 by OS 118 and/or application 120 via host storage logic 122. In one example, the data may be associated with execution of application 120. In another example, the data may be associated with operation of OS 118. OS 118 and/or application 120 may be configured to provide host storage logic 122 an indication that there is data to be stored in storage device 104.

Storage device 104 is configured to support a key-value (KV) interface, and is an object device. The KV interface includes Get(K), Put(K,V), and Delete(K) commands, and in some embodiments a Scan(K1,K2) command. Keys and values may be of arbitrary lengths, specified by the host device 102, e.g., host storage logic 122. The host device 102 may issue these commands to the storage device 104 via protocol extensions, e.g., via NVMe (Non-Volatile Memory Express) or NVMf (NVMe over Fabric) extensions, or may issue these commands using existing protocols such as S3 (Amazon Simple Storage Service), Swift (Swift general purpose programming language) and/or Kinetic (Seagate Kenetic Open Storage Platform).

A physical interface between host device 102 and storage device 104 may comply and/or be compatible with one or more interface protocols including, but not limited to, PCIe (Peripheral Component Interconnect Express), NVMe (Non-Volatile Memory Express), SCSI (Small Computer System Interface), AHCI (Advance Host Controller Interface), SATA (Serial ATA (Advanced Technology Attachment)), PATA (Parallel ATA) and/or Ethernet (IEEE (Institute of Electrical and Electronics Engineers) 802.3), etc. Device buffer circuitry 132, e.g., volatile buffer circuitry 140 and/or nonvolatile buffer circuitry 142, is configured to store an indirection data structure that maps each key to a location of a corresponding KV pair on physical media, i.e., NVM circuitry 134. The NVM circuitry 134 is configured to store the user keys and values in one or more data blocks, as described herein.

The key-based indirection table 144 may be stored in device buffer circuitry 132, i.e., volatile buffer circuitry 140 and/or nonvolatile buffer circuitry 142. For example, if the key-based indirection table 144 is stored in volatile buffer circuitry 140, the device storage logic 136 may be configured to store a copy of the key-based indirection table 144 to nonvolatile buffer circuitry 142 and/or NVM 134. The KV descriptors may be stored in NVM circuitry 134. The UDBIT 148 is stored in NVM circuitry 134. The UDBIT 148 may be stored in device buffer circuitry 132, i.e., volatile buffer circuitry 140 and/or nonvolatile buffer circuitry 142.

Figure 2:
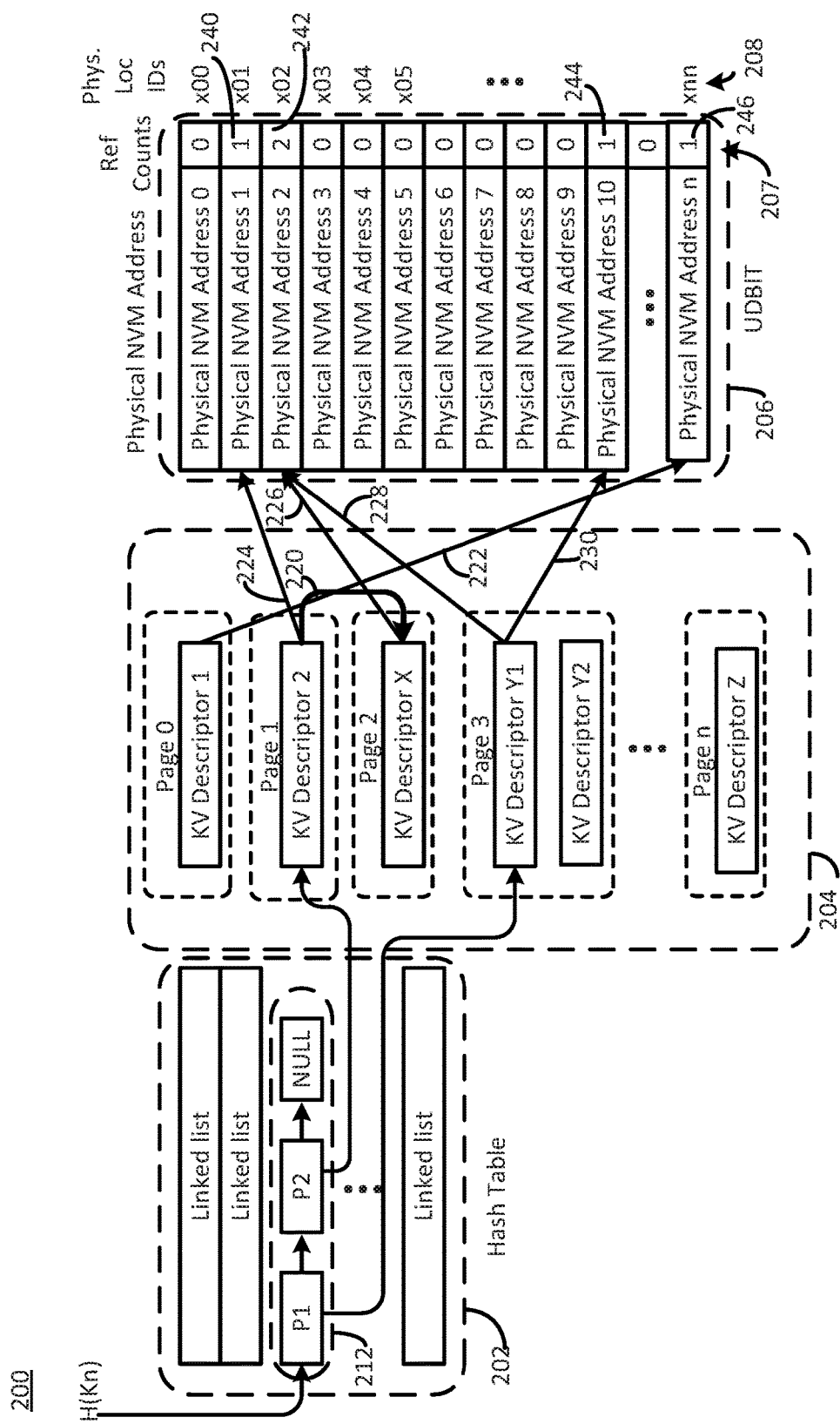
FIG. 2 illustrates a data structure of an example KV data dedupe storage system consistent with several embodiments of the present disclosure.

FIG. 2 illustrates a data structure 200 of an example KV data dedupe storage system consistent with several embodiments of the present disclosure. Data structure 200 includes a key-based indirection table 202, an NVM memory portion 204 and a unique data block indirection table (UDBIT) 206. The key-based indirection table 202 is one example of the key-based indirection table 144 of FIG. 1. The UDBIT 206 is one example of the UDBIT 148 of FIG. 1.

The key-based indirection table 202 is configured to relate a key of a key-value pair to a pointer ("key-based pointer") to a corresponding KV descriptor. The KV descriptor may be stored in NVM, e.g., NVM portion 204. In one nonlimiting example, the key-based indirection table 202 may correspond to a hash table. A key-based pointer may then be related to a hash of a corresponding key, Kn. In operation, device storage logic 136 and/or host storage logic 122 may be configured to hash an input key (Kn) utilizing a hash function to yield a head pointer. The head pointer is configured to point to a linked list that includes a key-based pointer to the corresponding KV descriptor. Any suitable hash function H (e.g., SHA256, etc.) may be utilized to determine the head pointer (and one or more key-based pointers) based, at least in part, on an input key, Kn, to generate hash table 202.

In some situations, a hash of two different keys may provide a same hash result, i.e., may result in a collision. In one nonlimiting example, the collision handling scheme may correspond to a linked-list per hash-table cell of hash table 202. The example hash table 202 may include one or more linked lists, e.g., linked list 212, configured to accommodate such collisions. A linked list may include one or more key-based pointers, e.g., key-based pointers P1 and P2.

The NVM portion 204 may include one or more KV descriptors, e.g., KV descriptor 1, . . . , KV descriptor Z. Each KV descriptor is configured to correspond to a respective KV pair and may be pointed to by a respective key-based pointer. Each KV descriptor is configured to contain information related to storage of the corresponding KV pair to NVM circuitry, e.g., NVM circuitry 134 of FIG. 1.

Table 1 illustrates one example KV descriptor data structure. Each KV descriptor is configured to consume a fixed size of NVM circuitry 134. In one nonlimiting example, a size of each KV descriptor may be 4KiB (Kibi bytes), i.e., 4*1024 bytes. However, the current disclosure is not limited in this regard.

TABLE 1

| |
|---|
| Key Length |
| Value Length |
| Key |
| Number of data blocks |
| Flag to indicate more than one descriptor for this key |
| Descriptor pointer to UDBIT entry for data block 0 |
| Descriptor pointer to UDBIT entry for data block 1 |
| . . . |
| Next pointer to the next KV descriptor of this key or NULL |

The KV descriptor is configured to contain information corresponding to a unique KV pair. The information includes a length of the key, a length of the value, the key itself (for collision check purposes), a number of data blocks of this KV pair, a flag to indicate more than one KV descriptor associated with this key and one or more pointers. In one nonlimiting example, if the KV pair has a relatively large payload, a single KV descriptor may not be able to save all the pointers of its data blocks. In other words, a size of a selected KV pair may be such that one KV descriptor cannot contain sufficient pointers for all of the data blocks of the corresponding KV pair and also satisfy a KV descriptor size constraint. A plurality of KV descriptors may then be associated with the selected KV pair. The flag is configured to indicate that the corresponding KV descriptor includes a next pointer that points to the next KV descriptor of this KV pair. The next KV descriptor may point to another KV descriptor until all the unique data blocks can be covered and the relatively large KV pair can be represented. Each of the plurality of KV descriptors associated with the KV pair is configured to correspond to the data structure illustrated in Table 1. The contents of the Key Length, Value Length and Key fields are configured to be the same for each of the plurality of KV descriptors. The Number of Data Blocks field is configured to contain the number of data blocks associated with the respective KV descriptor. Thus, a relatively large KV pair may be associated with a plurality of KV descriptors.

Thus, the KV descriptor is configured to contain one or more KV pointers. One or more KV pointers are configured to point to an entry, i.e., a physical NVM address, in the third indirection table (UDBIT) 206. One pointer, e.g., a last pointer ("next pointer") in the KV descriptor, is configured to point to a next KV descriptor for the KV pair. In some embodiments, the flag to indicate more than one KV descriptor may include and/or correspond to a number of KV descriptors associated with the corresponding KV pair. In some embodiments, relatively small KV pairs may be included directly in the KV descriptor. In some embodiments, if an amount of data at the end of the KV pairs is not aligned with dedupe granularity, the data may be included in the KV descriptor directly.

In one nonlimiting example, e.g., for NAND NVM, the NVM memory portion 204, and thus the plurality of KV descriptors, may be distributed across a plurality of NAND pages, e.g., pages Page 0, . . . , Page n. One or more KV descriptor(s) may be stored in each NAND page. In one nonlimiting example, a size of a KV descriptor may correspond to a size of a data block. Storing the KV descriptors to NVM circuitry is configured to preserve volatile memory, e.g., device buffer circuitry 132, of FIG. 1.

The third indirection table UDBIT 206 includes a plurality of physical NVM addresses, e.g., physical NVM address 0, . . . , physical NVM address n, and a plurality 207 of respective reference counts. Each physical NVM address corresponds to a respective physical location identifier (ID) of a plurality 208 of physical location identifiers, e.g., x00, . . . , xnn. In other words, each physical NVM address is configured to point to a physical location ID. Each physical location ID may then correspond to a respective data block.

The UDBIT 206 may be maintained in device buffer circuitry 132, e.g., volatile buffer circuitry 140 and/or nonvolatile buffer circuitry 142. If the UDBIT 206 is maintained in volatile buffer circuitry 140, then storage device 104 may include power-loss imminent capacitor(s) 152 configured to power the storage device 104, if supply power is lost, to allow the UDBIT 206 to be flushed to nonvolatile buffer circuitry 142 and/or NVM circuitry 134.

Table 2 illustrates one example data structure of the third indirection table UDBIT 206.

TABLE 2

| Physical NVM Address 0 | Reference Count 0 |
| Physical NVM Address 1 | Reference Count 1 |
| Physical NVM Address 2 | Reference Count 2 |
| Physical NVM Address 3 | Reference Count 3 |
| . . . | . . . |
| Physical NVM Address n | Reference Count n |

Table 2 includes a plurality of physical NVM addresses and a corresponding plurality of reference counts. Each physical NVM address is associated with a respective reference count. UDBIT 206 is configured to contain a physical NVM address and corresponding reference count for each unique data block stored in NVM circuitry 134. Each data block may have a standard dedupe data block size (e.g., 128B (bytes), 256B, 512B, 4KiB or 8KiB). The data structure 200 of example KV data dedupe storage system is one nonlimiting example that illustrates a single UDBIT table. In some embodiments, a plurality of UDBITs, e.g., UDBIT 206, may be included in a KV data dedupe storage system. Each UDBIT may then be configured to correspond to a respective data block granularity (e.g., 128B (bytes), 256B, 512B, 4KiB or 8KiB). Including a plurality of UDBITs, each with a respective granularity, may facilitate utilizing relatively fewer pointers and descriptors to represent a KV pair.

Each reference count is configured to provide an indication whether a corresponding data block is valid or invalid. In other words, a data block that is no longer valid may be erased (e.g., in a defrag operation) and/or reused. The reference count may be incremented for each descriptor pointer that points to the associated physical NVM address. For example, in response to each Put command, dedupe operations may be performed on each data block included in the corresponding KV pair. Each new unique data block may then be stored in NVM memory circuitry at a location pointed to by a corresponding physical NVM address and the associated reference count may be set to one (i.e., incremented from zero). The reference count associated with each existing unique data block that corresponds to a duplicate data block of the input KV pair may be incremented. The corresponding descriptor pointer of the duplicate input data block may be set to point to the physical NVM address associated with the existing unique data block. The reference count may be decremented in response to each Delete command that deletes the corresponding KV pair. Thus, when the reference count becomes 0, the corresponding data block pointed to by the associated physical NVM address is no longer valid. The corresponding memory locations may then be reclaimed during a defrag operation.

Thus, the UDBIT 206 may be configured to facilitate storage of unique data blocks and to reduce a likelihood of storing duplicate data blocks.

Turning again to FIG. 1, commands 106 may include Get(K), Put(K,V), and Delete(K) commands, and in some embodiments a Scan(K1,K2) command. Host device 102, e.g., host storage logic 122, is configured to provide commands 106 to storage device 104, e.g., device storage logic 136, configured to instruct device storage logic 136 with respect to data 108. Device storage logic 136 is configured to respond to each command 106.

Storage device 104 and device storage logic 136 may be configured to determine whether a key, i.e., K in the Get(K), Put(K,V), and/or Delete(K) command, is present in the NVM circuitry. Table 3 illustrates pseudocode corresponding to one nonlimiting example of operations to determine whether the key is present. The operations illustrated in Table 3 are one example of a function IsKeyPresent (hashtable [H], key), as described herein. In the pseudocode, H=hash(key) and hash-table[H] corresponds to a linked list, e.g., linked list 212 of FIG. 2.

TABLE 3

```
P = hash-table[H] -> head
While P != NULL
    Read KV descriptor stored in NVM (P contains the address of the
        KV descriptor)
    Read key field K of length Key Length at offset Sizeof(Key length
        field + Value length field) from the KV descriptor
    If (K==Key) return P
    P = P -> Next
End While
Return NULL
```

The pseudocode of Table 3 is configured to determine whether the key, K, is present in KV descriptors stored in NVM circuitry 134 and pointed to by respective key-based pointers included in key-based indirection table 144, as described herein.

In one example, host storage logic 122 may provide a Put(key, value) command configured to instruct device storage logic 136 to store a corresponding KV pair to NVM circuitry 134. Device storage logic 136 is configured to allocate a KV descriptor for the corresponding KV pair on NVM circuitry 134. Device storage logic 136 is further configured to determine a number of unique data blocks using a data dedupe technique. Dedupe techniques may include, but are not limited to, hashing, bloom filters, etc. In some situations, one or more of the data blocks included in the corresponding KV pair may have already been stored in the storage device 104 from other KV pairs, i.e., may be duplicates of existing unique data blocks. In these situations, device storage logic 136 may be further configured to update the UDBIT 148 to increment a corresponding reference count associated with each physical NVM address that points to the existing unique data blocks. The device storage logic 136 may be configured to update the corresponding KV descriptor to include one or more descriptor pointers to point to the physical NVM addresses that point to the existing unique data blocks.

Continuing with this example, in some situations, one or more of the data blocks included in the corresponding KV pair may be new data blocks (i.e., may be unique input KV data blocks that are not duplicates of unique data blocks stored in the storage device 104). In these situations, the device storage logic 136 is configured to allocate new storage space for the new data blocks and update the UDBIT 148. The device storage logic 136 is further configured to include one or more descriptor pointers in the corresponding KV descriptor that point to the physical NVM addresses that point to the new data blocks. In both situations, the device storage logic 136 may then be configured to update the corresponding key-based indirection table 144.

In some embodiments, device storage logic 136 may be configured to perform a pre-check of NVM circuitry 134 capacity against a size of the new information to add, e.g., the deduped input KV pair. In one nonlimiting example, if insufficient capacity NVM circuitry 134 is available, the device storage logic 136 may be configured to signal an error (e.g., a storage fail) to host device 102 and host storage logic 122.

In another example, host storage logic 122 may provide a Get(K) command configured to instruct device storage logic 136 to retrieve a KV pair that corresponds to the key, K, from NVM circuitry 134. In response to the Get(K) command, device storage logic 136 is configured to perform a hash-table lookup to load the KV descriptor. Device storage logic 136 may then use the KV descriptor (and physical NVM addresses) to load corresponding data blocks of the KV pair.

In another example, host storage logic 122 may provide a Delete(K) command configured to instruct device storage logic 136 to delete and/or trim the KV pair that corresponds to the key, K. Device storage logic 136 may then be configured to remove the key-based pointer corresponding to the key, K, from the hash table 144. Device storage logic 136 may be further configured to decrement a reference count included in UDBIT 148 and that is associated with any physical NVM address that corresponds to a stored data block of the KV pair. Each data block that corresponds to a physical NVM address that has an associated reference count of zero may then be deleted in the background, e.g., via a defrag operation. In an embodiment, the defrag operation may be performed at a corresponding dedupe data block granularity. In other words, in this embodiment the defrag operation may be performed at the dedupe data block granularity rather than, e.g., a NAND page granularity.

Turning again to FIG. 2, as described herein, a plurality of KV pairs may contain a same, i.e., duplicate, data block. FIG. 2 illustrates an example 200 data structure of an example KV data dedupe storage system that includes a plurality of nonlimiting illustrative examples of key-based pointers included in hash table 202, corresponding KV descriptors included in the NVM portion 204, descriptor pointers and corresponding UDBIT 206 entries (i.e., physical NVM addresses and associated reference counts). Hash table 202 includes a first key-based pointer, P1, and a second key-based pointer, P2, in a linked list 212. Each pointer P1 and P2 is related to a respective hash result of two keys, Kn (n=1,2). The first key-based pointer, P1, points to KV descriptor Y1 and the second key-based pointer, P2, points to KV descriptor 2. KV descriptor 2 includes a next pointer 220 that points to a second KV descriptor, KV descriptor X. KV descriptor 2 and KV descriptor X thus illustrate a plurality of KV descriptors associated with one KV pair (i.e., a second unique data block that corresponds to key K2). KV descriptor Y1 and KV descriptor Y2, in this example, are included in a same page (i.e., Page 3) of NVM portion 204.

KV descriptor 1 includes a descriptor pointer 222 that points to Physical NVM address n. KV descriptor 2 includes a descriptor pointer 224 that points to Physical NVM address 1. KV descriptor X includes a descriptor pointer 226 that points to Physical NVM address 2. KV descriptor Y1 includes a descriptor pointer 228 that points to Physical NVM address 2 and a descriptor pointer 230 that points to Physical NVM address 10. Thus, the KV pair associated with key-based pointer P2 that is associated with KV descriptor 2 and KV descriptor X includes data blocks pointed to by Physical NVM address 1 and Physical NVM address 2. The KV pairs associated with key-based pointers P1 and P2 and KV descriptors KV descriptor X and KV descriptor Y share a same data block that is pointed to by Physical NVM address 2 (that is pointed to by descriptor pointers 226 and 228.

The UDBIT 206 includes a plurality of reference counts 207 with each reference count associated with a respective physical NVM address. A first reference count 240 associated with Physical NVM address 1 is equal to 1. A second reference count 242 associated with Physical NVM address 2 is equal to 2. A tenth reference count 244 associated with Physical NVM address 10 is equal to 1. An $n^{th}$ reference count 246 associated with Physical NVM address n is equal to 1. Thus, each reference count corresponds to a respective number of descriptor pointers that points to the corresponding physical NVM address.

Thus, example data structure 200 illustrates a plurality of unique data blocks and corresponding pointers.

Figure 3:
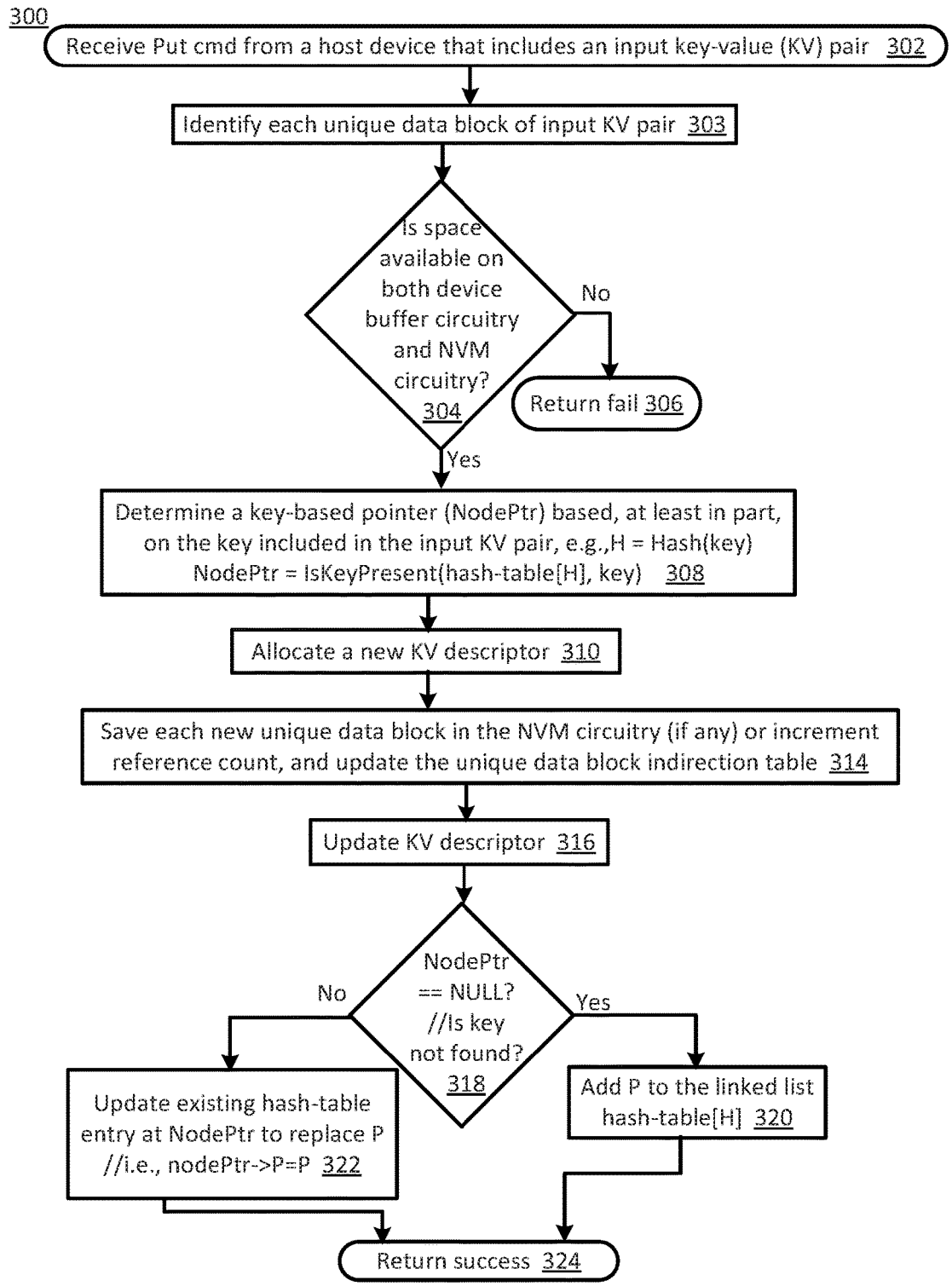
FIG. 3 is a flowchart of Put(key, value) operations according to various embodiments of the present disclosure.

FIG. 3 is a flowchart 300 of Put(key, value) operations according to various embodiments of the present disclosure. In particular, the flowchart 300 illustrates operations related to storing (with dedupe) a KV pair to a storage device. The operations may be performed, for example, by storage device 104, e.g., device storage logic 136, and/or host device 102, e.g., host storage logic 122, of FIG. 1.

Figure 6:
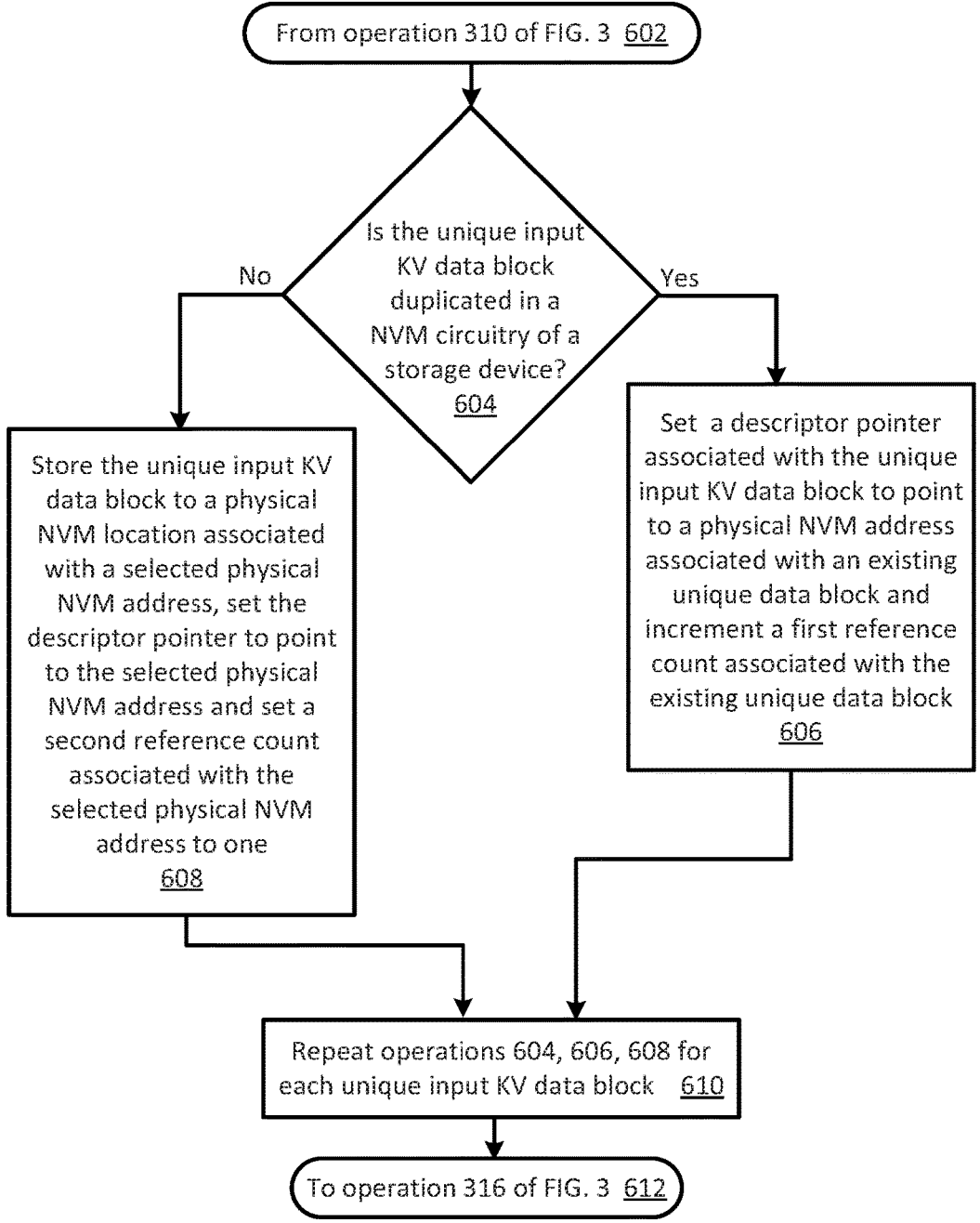
FIG. 6 is a flowchart of deduped KV operations according to various embodiments of the present disclosure.

Operations of this embodiment may begin with receiving a Put command from a host device that includes an input key-value (KV) pair at operation 302. Each unique data block may be identified for the input KV pair at operation 303. For example, each unique data block may be identified using a data dedupe technique. Operation 304 includes determining whether space is available in device buffer circuitry and NVM circuitry, e.g., device buffer circuitry 132 and NVM circuitry 134 of FIG. 1. The space availability may be determined based, at least in part, on the deduped input KV pair. If space is not available, a fail may be returned at operation 306. If space is available, a key-based pointer (Nodeptr) may be determined based, at least in part, on the key included in the input KV pair at operation 308. For example, the key may be hashed and a NodePtr may be determined. A new KV descriptor may be allocated at operation 310. Each new unique data block (if any) may be saved in the NVM circuitry or the reference count may be incremented, and the unique data block indirection table (i.e., UDBIT) may be updated at operation 314. FIG. 6, described in more detail below, is one example of operations of block 314. The KV descriptor may be updated at operation 316. Whether the NodePtr is equal to a NULL (i.e., if the key is not found) may be determined at operation 318. If the key is not found (i.e., NodePtr==NULL), the pointer, P may be added to a linked list hash table[H] at operation 320. In other words, P is a new key-based pointer (in a corresponding linked list) that points to the new KV descriptor. If the key is found (i.e., NodePtr !=NULL), an existing hash table entry may be updated at NodePtr to replace P (i.e., NodePtr→P=P) at operation 322. Success may then be returned at operation 324.

Thus, a KV pair that may include unique data blocks may be deduped and stored in a storage device.

Figure 4:
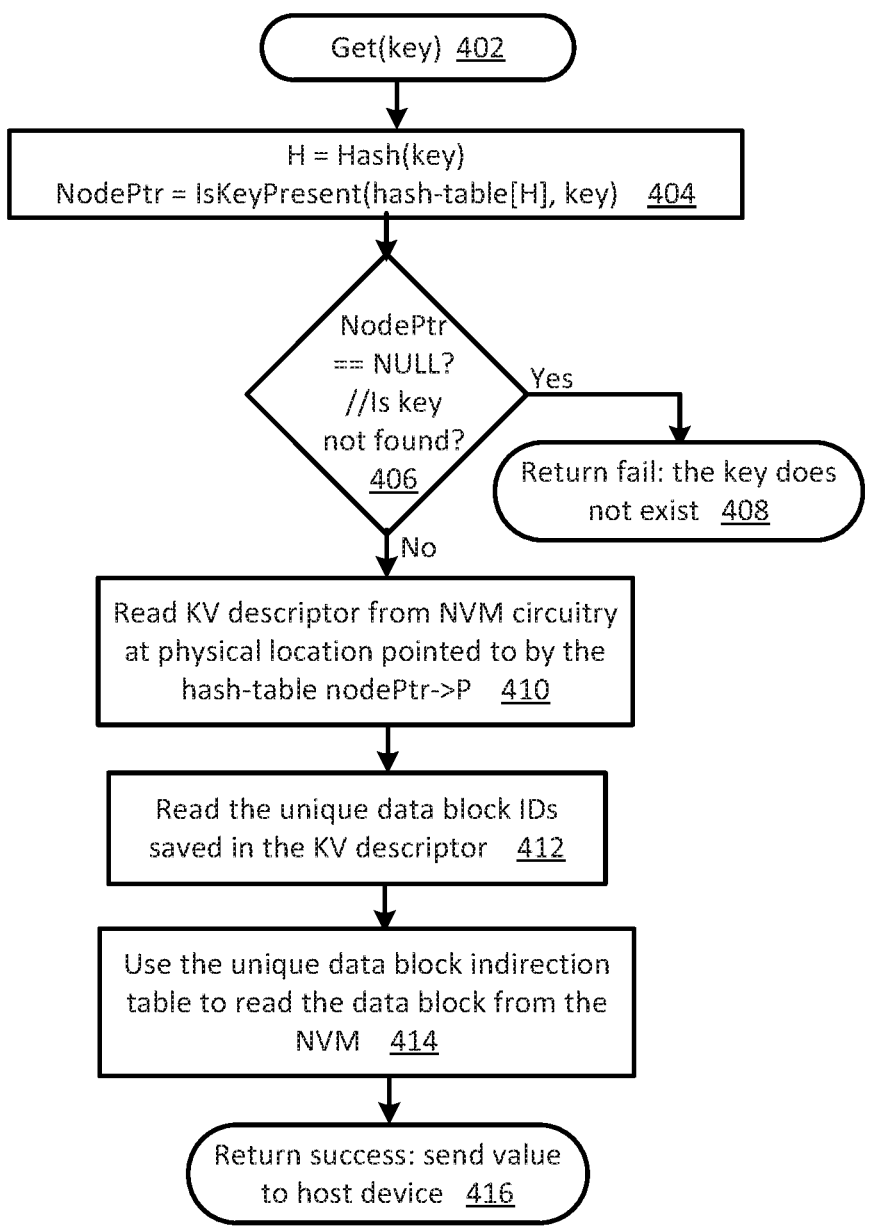
FIG. 4 is a flowchart of Get(key) operations according to various embodiments of the present disclosure.

FIG. 4 is a flowchart 400 of Get(key) operations according to various embodiments of the present disclosure. In particular, the flowchart 400 illustrates operations related to retrieving a KV pair from NVM circuitry included in a storage device. The operations may be performed, for example, by storage device 104, e.g., device storage logic 136, and/or host device 102, e.g., host storage logic 122, of FIG. 1.

Operations of this embodiment may begin with receiving a Get(key) command at operation 402. The key may be hashed and a NodePtr may be determined at operation 404. Whether the NodePtr is equal to a NULL (i.e., if the key is not found) may be determined at operation 406. If the key is not found (i.e., NodePtr==NULL, the key does not exist), a fail may be returned at operation 408. If the key is found (i.e., NodePtr !=NULL), a KV descriptor may be read from NVM circuitry at a physical location pointed to by the hash table NodePtr→P at operation 410. Unique data block identifiers, i.e., descriptor pointers, included in the KV descriptor may be read at operation 412. The data block may be read from the NVM circuitry using the UDBIT at operation 414. Success may be returned, i.e., the value associated with the key may be provided to the host device at operation 416.

Thus, a KV pair that includes deduped data blocks may be retrieved from a storage device.

Figure 5:
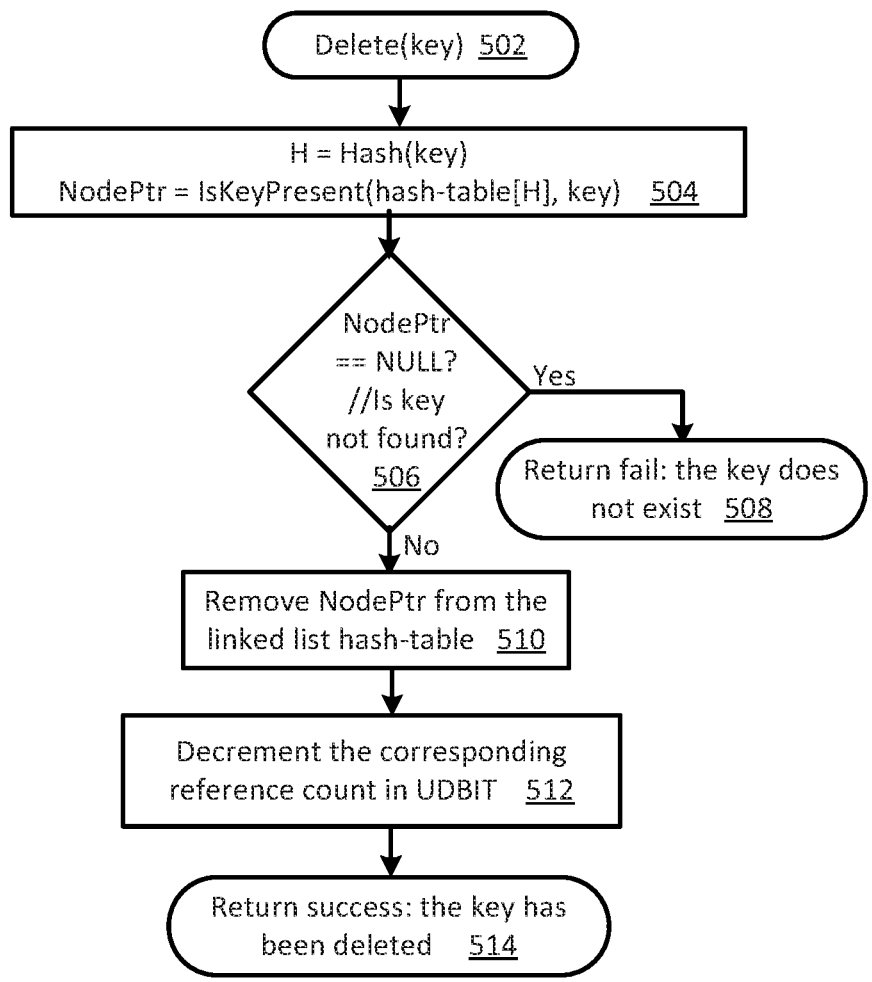
FIG. 5 is a flowchart of Delete(key) operations according to various embodiments of the present disclosure.

FIG. 5 is a flowchart 500 of Delete(key) operations according to various embodiments of the present disclosure. In particular, the flowchart 500 illustrates operations related to deleting a KV pair corresponding to the key of the KV pair. The operations may be performed, for example, by storage device 104, e.g., device storage logic 136, and/or host device 102, e.g., host storage logic 122, of FIG. 1.

Operations of this embodiment may begin with receiving a Delete(key) command at operation 502. The key may be hashed and a NodePtr may be determined at operation 504. Whether the NodePtr is equal to a NULL (i.e., if the key is not found) may be determined at operation 506. If the key is not found (i.e., NodePtr==NULL, the key does not exist), a fail may be returned at operation 508. If the key is found (i.e., NodePtr !=NULL), the NodePtr may be removed from the linked list hash table [H] at operation 510. The corresponding reference count in the UDBIT may be decremented at operation 512. Success may be returned (i.e., the key has been deleted) at operation 514.

Thus, a KV pair may be deleted from a storage device.

FIG. 6 is a flowchart 600 of deduped KV operations according to various embodiments of the present disclosure. In particular, the flowchart 600 illustrates one example of operations 314 of FIG. 3. The operations may be performed, for example, by storage device 104, e.g., device storage logic 136, and/or host device 102, e.g., host storage logic 122 of FIG. 1.

Operation 602 begins with and/or corresponds to operation 310 of FIG. 3. Whether the unique input KV data block is duplicated in a NVM circuitry of a storage device may be determined at operation 604. If the unique input KV data block is a duplicate of the existing unique data block, operation 606 may include setting a descriptor pointer associated with the unique input KV data block to point to a physical NVM address associated with an existing unique data block and incrementing a first reference count associated with the existing unique data block. Program flow may then proceed to operation 610. If the unique input KV data block is not duplicated in the NVM circuitry, operation 608 may include storing the unique input KV data block to a physical NVM location associated with a selected physical NVM address, setting the descriptor pointer to point to the selected physical NVM address and setting a second reference count associated with the selected physical NVM address to one. Program flow may then proceed to operation 610. Operation 610 includes repeating operations 604, 606 and 608 for each unique input KV data block. For example, each unique input KV data block may have been identified using a dedupe technique (e.g., operation 303 of FIG. 3). Program flow may then proceed to operation 316 of FIG. 3, at operation 612.

The key-based pointer may be stored in a key-based indirection table. The descriptor pointer may be stored in a first KV descriptor included in an NVM circuitry. The selected physical NVM address and associated second reference count may be stored in a unique data block indirection table (UDBIT). The key-based pointer is configured to point to the first KV descriptor. The descriptor pointer is configured to point to the physical NVM address in the UDBIT.

Thus, a KV pair may be deduped prior to and/or during storage operations associated with storing the KV pair to a storage device.

Table 4 illustrates one example of pseudocode of defragment ("defrag") operations according to various embodiments of the present disclosure.

TABLE 4

```
Defrag (Band B)
DataBlockIndex = 0
For DataBlockIndex < # of data blocks in B
    Data = DataBlock[DataBlockIndex];
    If (Data is a KV descriptor)
        If (the KV descriptor is still valid)
            Relocate the KV descriptor
            Update the hash-table
        End if
    Elseif (Data is a unique data block)
        If (the data block is still valid, i.e., ref count > zero)
            Relocate the data block
            Update the unique data block indirection table
        End if
    End if
    DataBlockIndex++;
End for
```

A storage device, e.g., storage device 104 and device storage logic 136, may be configured to reclaim storage space via defrag operations. The defrag operations may be performed at dedupe data block granularity. In some embodiments, each KV descriptor may be configured to have a same size as the dedupe data block granularity. For each Put(K, V) and Delete(K) operation, device storage logic 136 may be configured to update physical NVM location invalidity at the dedupe data block granularity level. During defrag, device storage logic 136 may be configured to select a most invalid physical NVM portion (e.g., a NAND band for NAND NVM), and scan each data block from the beginning to the end. If the data block is a KV descriptor, device storage logic 136 may be configured to look up the hash-table to determine whether the KV descriptor and corresponding data block are still valid. If the data block is a unique data block (i.e., the reference count in the UDBIT is non-zero), device storage logic 136 may be configured to look up the unique data block indirection table to check its validity as illustrated in the pseudocode illustrated in Table 4. For the valid data blocks, device storage logic 136 may be configured to relocate the data and update the corresponding indirection system.

Thus, defrag operations may be performed at a data block granularity.

Thus, a system, apparatus and/or method are configured to perform data dedupe operations on a storage device. The system, apparatus and/or method are configured to determine whether a block of data included in a KV pair to be stored duplicates an existing stored block of data. A pointer may be set to point to the currently stored data block if the block of data to be stored is a duplicate and a reference count may be incremented. If the block of data to be stored is not a duplicate, the block of data may be stored and the reference count may be set to one.

While the flowcharts (and/or pseudocode) of FIGS. 3 through 6 and Tables 3 and 4 illustrate operations according various embodiments, it is to be understood that not all of the operations depicted in FIGS. 3 through 6 and Tables 3 and 4 are necessary for other embodiments. In addition, it is fully contemplated herein that in other embodiments of the present disclosure, the operations depicted in FIGS. 3, 4, 5 and/or 6 and/or Tables 3 and/or 4 and/or other operations described herein may be combined in a manner not specifically shown in any of the drawings, and such embodiments may include less or more operations than are illustrated in FIGS. 3 through 6 and Tables 3 and 4. Thus, claims directed to features and/or operations that are not exactly shown in one drawing or table are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 110, 130 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

The foregoing provides example system architectures and methodologies, however, modifications to the present disclosure are possible. The processors may include one or more processor cores and may be configured to execute system software. System software may include, for example, an operating system. Device memory may include I/O memory buffers configured to store one or more data packets that are to be transmitted by, or received by, a network interface.

The operating system (OS) 118 may be configured to manage system resources and control tasks that are run on, e.g., host device 102. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory circuitry 114 may include one or more of the following types of memory: semiconductor firmware memory, programmable memory, nonvolatile memory, read only memory, electrically programmable memory, random access memory, flash memory, magnetic disk memory, and/ or optical disk memory. Either additionally or alternatively memory circuitry may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The computer-readable storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of computer-readable storage devices suitable for storing electronic instructions.

Host storage logic 122 and device storage logic 136 may be configured to provide and execute, respectively, commands 106, as described herein. Commands 106 may include for example, Put(key, value), Get(key), Delete(key), Scan(key1, key2). Host storage logic 122, device storage logic 136 and/or one or more of commands 106 may comply or be compatible with a nonvolatile memory (NVM) specification related to communication with, and operation of, storage devices. For example, host storage logic 122, device storage logic 136 and/or one or more of commands 106 may comply with a NVM specification titled: NVM Express®, Revision 1.2, released November 2014, by NVM Express Workgroup, and/or Revision 1.2.1, released June 2016, and/or later and/or related versions of this specification, e.g., Revision 1.3, released May 2017.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to key-value deduplication, as discussed below.

Example 1

According to this example, there is provide an apparatus. The apparatus includes a device storage logic. The device storage logic is to determine a key-based pointer based, at least in part, on a key included in an input key-value (KV) pair received from a host device and to determine whether a unique input KV data block included in the input KV pair is duplicated in a nonvolatile memory circuitry of a storage device. The device storage logic is further to set a descriptor pointer associated with the unique input KV data block to point to a physical nonvolatile memory (NVM) address associated with an existing unique data block and increment a first reference count associated with the existing unique data block, if the unique input KV data block is a duplicate of the existing unique data block, or store the unique input KV data block to a physical NVM location associated with a selected physical NVM address, set the descriptor pointer to point to the selected physical NVM address and set a second reference count associated with the selected physical NVM address to one, if the unique input KV data block is not duplicated in the NVM circuitry.

Example 2

This example includes the elements of example 1, wherein the device storage logic is to store the key-based pointer to a key-based indirection table, store the descriptor pointer to a first KV descriptor and store the selected physical NVM address and associated second reference count to a unique data block indirection table (UDBIT), the key-based pointer to point to the first KV descriptor, the descriptor pointer to point to the physical NVM address in the UDBIT.

Example 3

This example includes the elements of example 1, wherein the device storage logic is to identify each unique input KV data block in the input KV pair.

Example 4

This example includes the elements of example 2, wherein the first KV descriptor includes a key length, a value length, the key, a number of data blocks included in the KV pair and one or more descriptor pointers, each descriptor pointer to point to a respective physical NVM address included in the UDBIT.

Example 5

This example includes the elements of example 4, wherein the first KV descriptor includes at least one of a flag to indicate a plurality of KV descriptors associated with the key and/or a value corresponding to a number of KV descriptors associated with the key and further includes a pointer to a next KV descriptor or a NULL.

Example 6

This example includes the elements according to any one of examples 1 to 3, wherein the key-based pointer is a hash of the key.

Example 7

This example includes the elements of example 2, wherein the key-based indirection table is stored in a device buffer circuitry and the first KV descriptor is stored in the NVM circuitry.

Example 8

This example includes the elements according to any one of examples 1 to 3, wherein the device storage logic is to decrement a selected reference count in response to a delete command from the host device.

Example 9

This example includes the elements according to any one of examples 1 to 3, wherein the KV pair includes a plurality of data blocks, a first subset of the data blocks having a first granularity, a second subset of the data blocks having a second granularity, the first subset of data blocks associated with a first a unique data block indirection table (UDBIT) and the second subset of data blocks associated with a second UDBIT.

Example 10

This example includes the elements of example 7, wherein the key-based indirection table is stored in at least one of a volatile buffer circuitry and/or a nonvolatile buffer circuitry.

Example 11

According to this example, there is provided a method. The method includes determining, by a device storage logic, a key-based pointer based, at least in part, on a key included in an input key-value (KV) pair received from a host device; and determining, by the device storage logic, whether a unique input KV data block included in the input KV pair is duplicated in a nonvolatile memory circuitry of a storage device. The method further includes setting, by the device storage logic, a descriptor pointer associated with the unique input KV data block to point to a physical nonvolatile memory (NVM) address associated with an existing unique data block and incrementing, by the device storage logic, a first reference count associated with the existing unique data block, if the unique input KV data block is a duplicate of the existing unique data block, or storing, by the device storage logic, the unique input KV data block to a physical NVM location associated with a selected physical NVM address, setting, by the device storage logic, the descriptor pointer to point to the selected physical NVM address and setting, by the device storage logic, a second reference count associated with the selected physical NVM address to one, if the unique input KV data block is not duplicated in the NVM circuitry.

Example 12

This example includes the elements of example 11, further including storing, by the device storage logic, the key-based pointer to a key-based indirection table, storing, by the device storage logic, the descriptor pointer to a first KV descriptor and storing, by the device storage logic, the selected physical NVM address and associated second reference count to a unique data block indirection table (UDBIT), the key-based pointer to point to the first KV descriptor, the descriptor pointer to point to the physical NVM address in the UDBIT.

Example 13

This example includes the elements of example 11, further including identifying, by the device storage logic, each unique input KV data block in the input KV pair.

Example 14

This example includes the elements of example 12, wherein the first KV descriptor includes a key length, a value length, the key, a number of data blocks included in the KV pair and one or more descriptor pointers, each descriptor pointer to point to a respective physical NVM address included in the UDBIT.

Example 15

This example includes the elements of example 14, wherein the first KV descriptor includes at least one of a flag to indicate a plurality of KV descriptors associated with the key and/or a value corresponding to a number of KV descriptors associated with the key and further includes a pointer to a next KV descriptor or a NULL.

Example 16

This example includes the elements of example 11, wherein the key-based pointer is a hash of the key.

Example 17

This example includes the elements of example 12, wherein the key-based indirection table is stored in a device buffer circuitry and the first KV descriptor is stored in the NVM circuitry.

Example 18

This example includes the elements of example 11, further including decrementing, by the device storage logic, a selected reference count in response to a delete command from the host device.

Example 19

This example includes the elements of example 11, wherein the KV pair includes a plurality of data blocks, a first subset of the data blocks having a first granularity, a second subset of the data blocks having a second granularity, the first subset of data blocks associated with a first a unique data block indirection table (UDBIT) and the second subset of data blocks associated with a second UDBIT.

Example 20

This example includes the elements of example 17, wherein the key-based indirection table is stored in at least one of a volatile buffer circuitry and/or a nonvolatile buffer circuitry.

Example 21

According to this example, there is provided a storage device. The storage device includes a nonvolatile memory circuitry; a device buffer circuitry; and a device storage logic. The device storage logic is to determine a key-based pointer based, at least in part, on a key included in an input key-value (KV) pair received from a host device; and to determine whether a unique input KV data block included in the input KV pair is duplicated in the nonvolatile memory circuitry. The device storage logic is further to set a descriptor pointer associated with the unique input KV data block to point to a physical nonvolatile memory (NVM) address associated with an existing unique data block and increment a first reference count associated with the existing unique data block, if the unique input KV data block is a duplicate of the existing unique data block, or store the unique input KV data block to a physical NVM location associated with a selected physical NVM address, set the descriptor pointer to point to the selected physical NVM address and set a second reference count associated with the selected physical NVM address to one, if the unique input KV data block is not duplicated in the NVM circuitry.

Example 22

This example includes the elements of example 21, wherein the device storage logic is to store the key-based pointer to a key-based indirection table, store the descriptor pointer to a first KV descriptor and store the selected physical NVM address and associated second reference count to a unique data block indirection table (UDBIT), the key-based pointer to point to the first KV descriptor, the descriptor pointer to point to the physical NVM address in the UDBIT.

Example 23

This example includes the elements of example 21, wherein the device storage logic is to identify each unique input KV data block in the input KV pair.

Example 24

This example includes the elements of example 22, wherein the first KV descriptor includes a key length, a value length, the key, a number of data blocks included in the KV pair and one or more descriptor pointers, each descriptor pointer to point to a respective physical NVM address included in the UDBIT.

Example 25

This example includes the elements of example 24, wherein the first KV descriptor includes at least one of a flag to indicate a plurality of KV descriptors associated with the key and/or a value corresponding to a number of KV descriptors associated with the key and further includes a pointer to a next KV descriptor or a NULL.

Example 26

This example includes the elements according to any one of examples 21 to 23, wherein the key-based pointer is a hash of the key.

Example 27

This example includes the elements of example 22, wherein the key-based indirection table is stored in the device buffer circuitry and the first KV descriptor is stored in the NVM circuitry.

Example 28

This example includes the elements according to any one of examples 21 to 23, wherein the device storage logic is to decrement a selected reference count in response to a delete command from the host device.

Example 29

This example includes the elements according to any one of examples 21 to 23, wherein the KV pair includes a plurality of data blocks, a first subset of the data blocks having a first granularity, a second subset of the data blocks having a second granularity, the first subset of data blocks associated with a first a unique data block indirection table (UDBIT) and the second subset of data blocks associated with a second UDBIT.

Example 30

This example includes the elements of example 27, wherein the key-based indirection table is stored in at least one of a volatile buffer circuitry and/or a nonvolatile buffer circuitry.

Example 31

This example includes the elements according to any one of examples 21 to 23, wherein the nonvolatile memory is byte addressable write-in-place memory.

Example 32

According to this example, there is provided a computer readable storage device. The device has stored thereon instructions that when executed by one or more processors result in the following operations including: determining a key-based pointer based, at least in part, on a key included in an input key-value (KV) pair received from a host device; and determining whether a unique input KV data block included in the input KV pair is duplicated in a nonvolatile memory circuitry of a storage device. The device further has stored thereon instructions that when executed by one or more processors result in the following operations including: setting a descriptor pointer associated with the unique input KV data block to point to a physical nonvolatile memory (NVM) address associated with an existing unique data block and incrementing a first reference count associated with the existing unique data block, if the unique input KV data block is a duplicate of the existing unique data block, or storing the unique input KV data block to a physical NVM location associated with a selected physical NVM address, setting the descriptor pointer to point to the selected physical NVM address and setting a second reference count associated with the selected physical NVM address to one, if the unique input KV data block is not duplicated in the NVM circuitry.

Example 33

This example includes the elements of example 32, wherein the instructions that when executed by one or more processors results in the following additional operations including storing the key-based pointer to a key-based indirection table, storing the descriptor pointer to a first KV descriptor and storing the selected physical NVM address and associated second reference count to a unique data block indirection table (UDBIT), the key-based pointer to point to the first KV descriptor, the descriptor pointer to point to the physical NVM address in the UDBIT.

Example 34

This example includes the elements of example 32, wherein the instructions that when executed by one or more processors results in the following additional operations including identifying each unique input KV data block in the input KV pair.

Example 35

This example includes the elements of example 33, wherein the first KV descriptor includes a key length, a value length, the key, a number of data blocks included in the KV pair and one or more descriptor pointers, each descriptor pointer to point to a respective physical NVM address included in the UDBIT.

Example 36

This example includes the elements of example 35, wherein the first KV descriptor includes at least one of a flag to indicate a plurality of KV descriptors associated with the key and/or a value corresponding to a number of KV descriptors associated with the key and further includes a pointer to a next KV descriptor or a NULL.

Example 37

This example includes the elements according to any one of examples 32 to 34, wherein the key-based pointer is a hash of the key.

Example 38

This example includes the elements of example 33, wherein the key-based indirection table is stored in a device buffer circuitry and the first KV descriptor is stored in the NVM circuitry.

Example 39

This example includes the elements according to any one of examples 32 to 34, wherein the instructions that when executed by one or more processors results in the following additional operations including decrementing a selected reference count in response to a delete command from the host device.

Example 40

This example includes the elements according to any one of examples 32 to 34, wherein the KV pair includes a plurality of data blocks, a first subset of the data blocks having a first granularity, a second subset of the data blocks having a second granularity, the first subset of data blocks associated with a first a unique data block indirection table (UDBIT) and the second subset of data blocks associated with a second UDBIT.

Example 41

This example includes the elements of example 38, wherein the key-based indirection table is stored in at least one of a volatile buffer circuitry and/or a nonvolatile buffer circuitry.

Example 42

According to this example, there is provided a device. The device includes means for determining, by a device storage logic, a key-based pointer based, at least in part, on a key included in an input key-value (KV) pair received from a host device; and means for determining, by the device storage logic, whether a unique input KV data block included in the input KV pair is duplicated in a nonvolatile memory circuitry of a storage device. The device further includes means for setting, by the device storage logic, a descriptor pointer associated with the unique input KV data block to point to a physical nonvolatile memory (NVM) address associated with an existing unique data block and means for incrementing, by the device storage logic, a first reference count associated with the existing unique data block, if the unique input KV data block is a duplicate of the existing unique data block, or means for storing, by the device storage logic, the unique input KV data block to a physical NVM location associated with a selected physical NVM address, means for setting, by the device storage logic, the descriptor pointer to point to the selected physical NVM address and means for setting, by the device storage logic, a second reference count associated with the selected physical NVM address to one, if the unique input KV data block is not duplicated in the NVM circuitry.

Example 43

This example includes the elements of example 42, further including means for storing, by the device storage logic, the key-based pointer to a key-based indirection table, means for storing, by the device storage logic, the descriptor pointer to a first KV descriptor and means for storing, by the device storage logic, the selected physical NVM address and associated second reference count to a unique data block indirection table (UDBIT), the key-based pointer to point to the first KV descriptor, the descriptor pointer to point to the physical NVM address in the UDBIT.

Example 44

This example includes the elements of example 42, further including means for identifying, by the device storage logic, each unique input KV data block in the input KV pair.

Example 45

This example includes the elements of example 43, wherein the first KV descriptor includes a key length, a value length, the key, a number of data blocks included in the KV pair and one or more descriptor pointers, each descriptor pointer to point to a respective physical NVM address included in the UDBIT.

Example 46

This example includes the elements of example 45, wherein the first KV descriptor includes at least one of a flag to indicate a plurality of KV descriptors associated with the key and/or a value corresponding to a number of KV descriptors associated with the key and further includes a pointer to a next KV descriptor or a NULL.

Example 47

This example includes the elements according to any one of examples 42 to 44, wherein the key-based pointer is a hash of the key.

Example 48

This example includes the elements of example 43, wherein the key-based indirection table is stored in a device buffer circuitry and the first KV descriptor is stored in the NVM circuitry.

Example 49

This example includes the elements according to any one of examples 42 to 44, further including means for decrementing, by the device storage logic, a selected reference count in response to a delete command from the host device.

Example 50

This example includes the elements according to any one of examples 42 to 44, wherein the KV pair includes a plurality of data blocks, a first subset of the data blocks having a first granularity, a second subset of the data blocks having a second granularity, the first subset of data blocks associated with a first a unique data block indirection table (UDBIT) and the second subset of data blocks associated with a second UDBIT.

Example 51

This example includes the elements of example 48, wherein the key-based indirection table is stored in at least one of a volatile buffer circuitry and/or a nonvolatile buffer circuitry.

Example 52

According to this example, there is provided a system. The system includes at least one device arranged to perform the method according to any one of examples 11 to 20.

Example 53

According to this example, there is provided a device. The device includes means to perform the method according to any one of examples 11 to 20.

Example 54

According to this example, there is provided a computer readable storage device having stored thereon instructions that when executed by one or more processors result in the following operations including: the method according to any one of examples 11 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a device storage logic to determine a key-based pointer based at least in part on a key included in an input key-value (KV) pair received from a host device;
determine whether a unique input KV data block included in the input KV pair is duplicated in nonvolatile memory (NVM) circuitry of a storage device; and
set a descriptor pointer associated with the unique input KV data block to point to a physical (NVM) address associated with an existing unique data block and increment a first reference count associated with the existing unique data block, if the unique input KV data block is a duplicate of the existing unique data block, or
store the unique input KV data block to a physical NVM location associated with a selected physical NVM address, set the descriptor pointer to point to the selected physical NVM address and set a second reference count associated with the selected physical NVM address to one, if the unique input KV data block is not duplicated in the NVM circuitry.

2. The apparatus of claim 1, wherein the device storage logic is to store the key-based pointer to a key-based indirection table, store the descriptor pointer to a first KV descriptor and store the selected physical NVM address and associated second reference count to a unique data block indirection table (UDBIT), the key-based pointer to point to the first KV descriptor, the descriptor pointer to point to the physical NVM address in the UDBIT.

3. The apparatus of claim 2, wherein the first KV descriptor comprises a key length, a value length, the key, a number of data blocks included in the KV pair and one or more descriptor pointers, each descriptor pointer to point to a respective physical NVM address included in the UDBIT.

4. The apparatus of claim 3, wherein the first KV descriptor comprises at least one of a flag to indicate a plurality of KV descriptors associated with a key and/or a value corresponding to a number of KV descriptors associated with the key and further comprises a pointer to a next KV descriptor or a NULL.

5. The apparatus of claim 1, wherein the device storage logic is to identify each unique input KV data block in the input KV pair.

6. The apparatus of claim 1, wherein the key-based pointer is a hash of the key.

7. The apparatus of claim 1, wherein the device storage logic is to decrement a selected reference count in response to a delete command from the host device.

8. The apparatus of claim 1, wherein the KV pair comprises a plurality of data blocks, a first subset of the data blocks having a first granularity, a second subset of the data blocks having a second granularity, the first subset of the data blocks associated with a first a unique data block indirection table (UDBIT) and the second subset of the data blocks associated with a second UDBIT.

9. A method comprising:
   determining, by a device storage logic, a key-based pointer based at least in part on a key included in an input key-value (KV) pair received from a host device;
   determining, by the device storage logic, whether a unique input KV data block included in the input KV pair is duplicated in nonvolatile memory (NVM) circuitry of a storage device; and
   setting, by the device storage logic, a descriptor pointer associated with the unique input KV data block to point to a physical (NVM) address associated with an existing unique data block and incrementing, by the device storage logic, a first reference count associated with the existing unique data block, if the unique input KV data block is a duplicate of the existing unique data block, or
   storing, by the device storage logic, the unique input KV data block to a physical NVM location associated with a selected physical NVM address, setting, by the device storage logic, the descriptor pointer to point to the selected physical NVM address and setting, by the device storage logic, a second reference count associated with the selected physical NVM address to one, if the unique input KV data block is not duplicated in the NVM circuitry.

10. The method of claim 9, further comprising storing, by the device storage logic, the key-based pointer to a key-based indirection table, storing, by the device storage logic, the descriptor pointer to a first KV descriptor and storing, by the device storage logic, the selected physical NVM address and associated second reference count to a unique data block indirection table (UDBIT), the key-based pointer to point to the first KV descriptor, the descriptor pointer to point to the physical NVM address in the UDBIT.

11. The method of claim 10, wherein the first KV descriptor comprises a key length, a value length, the key, a number of data blocks included in the KV pair and one or more descriptor pointers, each descriptor pointer to point to a respective physical NVM address included in the UDBIT.

12. The method of claim 11, wherein the first KV descriptor comprises at least one of a flag to indicate a plurality of KV descriptors associated with the key and/or a value corresponding to a number of KV descriptors associated with the key and further comprises a pointer to a next KV descriptor or a NULL.

13. The method of claim 9, further comprising identifying, by the device storage logic, each unique input KV data block in the input KV pair.

14. The method of claim 9, further comprising decrementing, by the device storage logic, a selected reference count in response to a delete command from the host device.

15. The method of claim 9, wherein the KV pair comprises a plurality of data blocks, a first subset of the data blocks having a first granularity, a second subset of the data blocks having a second granularity, the first subset of the data blocks associated with a first a unique data block indirection table (UDBIT) and the second subset of the data blocks associated with a second UDBIT.

16. A storage device comprising:
   nonvolatile memory (NVM) circuitry;
   device buffer circuitry; and
   device storage logic to: determine a key-based pointer based, at least in part, on a key included in an input key-value (KV) pair received from a host device;
   determine whether a unique input KV data block included in the input KV pair is duplicated in the NVM circuitry; and
   set a descriptor pointer associated with the unique input KV data block to point to a physical NVM address associated with an existing unique data block and increment a first reference count associated with the existing unique data block, if the unique input KV data block is a duplicate of the existing unique data block, or
   store the unique input KV data block to a physical NVM location associated with a selected physical NVM address, set the descriptor pointer to point to the selected physical NVM address and set a second reference count associated with the selected physical NVM address to one, if the unique input KV data block is not duplicated in the NVM circuitry.

17. The storage device of claim 16, wherein the device storage logic is to store the key-based pointer to a key-based indirection table, store the descriptor pointer to a first KV descriptor and store the selected physical NVM address and associated second reference count to a unique data block indirection table (UDBIT), the key-based pointer to point to the first KV descriptor, the descriptor pointer to point to the physical NVM address in the UDBIT.

18. The storage device of claim 17, wherein the first KV descriptor comprises a key length, a value length, the key, a number of data blocks included in the KV pair and one or more descriptor pointers, each descriptor pointer to point to a respective physical NVM address included in the UDBIT.

19. The storage device of claim 18, wherein the first KV descriptor comprises at least one of a flag to indicate a plurality of KV descriptors associated with the key and/or a value corresponding to a number of KV descriptors associated with the key and further comprises a pointer to a next KV descriptor or a NULL.

20. The storage device of claim 17, wherein the key-based indirection table is stored in the device buffer circuitry and the first KV descriptor is stored in the NVM circuitry.

21. The storage device of claim 20, wherein the key-based indirection table is stored in at least one of a volatile buffer circuitry and/or a nonvolatile buffer circuitry.

22. The storage device of claim 16, wherein the device storage logic is to identify each unique input KV data block in the input KV pair.

23. The storage device of claim 16, wherein the device storage logic is to decrement a selected reference count in response to a delete command from the host device.

24. The storage device of claim 16, wherein the KV pair comprises a plurality of data blocks, a first subset of the data blocks having a first granularity, a second subset of the data blocks having a second granularity, the first subset of the data blocks associated with a first a unique data block indirection table (UDBIT) and the second subset of the data blocks associated with a second UDBIT.

25. The storage device of claim 16, wherein the NVM circuitry is byte addressable write-in-place memory.

* * * * *